United States Patent [19]

Gerdt et al.

[11] Patent Number: 4,634,858
[45] Date of Patent: Jan. 6, 1987

[54] VARIABLE COUPLER FIBEROPTIC SENSOR

[75] Inventors: David W. Gerdt; Lawrence H. Gilligan, both of Charlottesville, Va.

[73] Assignee: Sperry Corporation, New York, N.Y.

[21] Appl. No.: 661,630

[22] Filed: Oct. 17, 1984

[51] Int. Cl.$^4$ .......................... H01J 5/16; H01J 40/14
[52] U.S. Cl. ................................ 250/227; 250/231 R; 73/705
[58] Field of Search .................. 73/705, 800; 250/227, 250/231 R

[56] References Cited

U.S. PATENT DOCUMENTS

| | | | |
|---|---|---|---|
| 4,360,247 | 11/1982 | Beasley | 73/705 |
| 4,368,645 | 1/1983 | Glenn et al. | 73/705 |
| 4,482,890 | 11/1984 | Forbes et al. | 250/227 |
| 4,495,819 | 1/1985 | Tekippe | 73/705 |
| 4,545,253 | 10/1985 | Avicola | 250/227 |

Primary Examiner—David C. Nelms
Assistant Examiner—William L. Oen
Attorney, Agent, or Firm—Howard P. Terry

[57] ABSTRACT

A variable coupler fiberoptic sensor in which a fused, tapered, biconical directional fiberoptic coupler is encapsulated in a stress birefringent medium whose index of refraction changes with applied stress.

The ratio of power in the output fibers of the directional coupler varies with the change of index of refraction of the encapsulating medium as stress is applied to the medium.

6 Claims, 3 Drawing Figures

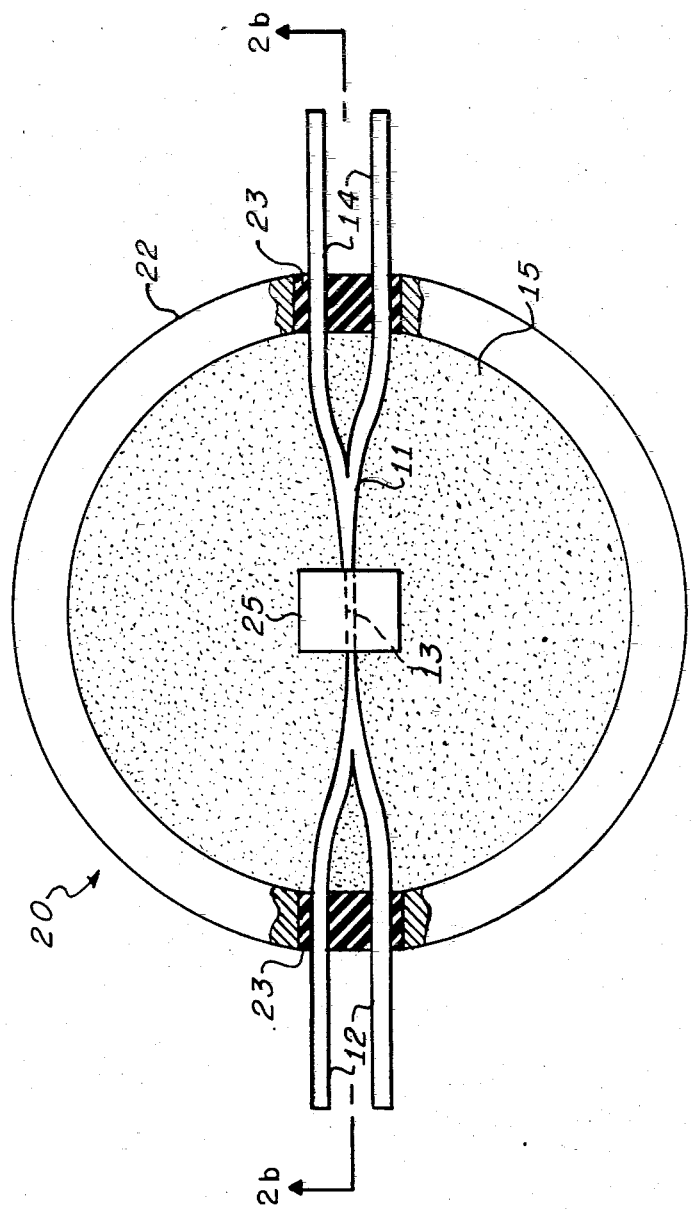
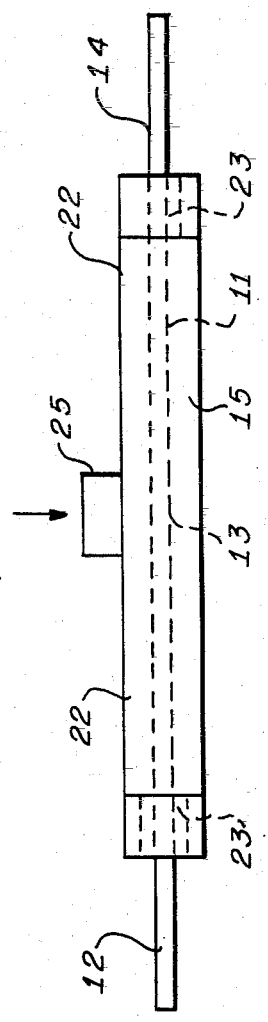
FIG.2a.
FIG.2b.

VARIABLE COUPLER FIBEROPTIC SENSOR

BACKGROUND OF THE INVENTION

1. Field of the Invention

The invention relates to fiberoptic sensors whose operation is based on varying the ratio of output power in a fiberoptic directional coupler.

2. Description of the Prior Art

Sensors, such as accelerometers, microphones, hydrophones and magnetometers including both electromechanical devices and, more recently, fiberoptic devices are well known. Fiberoptic sensors offer advantages in D.C. sensitivity, dynamic range, and interference rejection.

Existing fiberoptic sensors have used such principles as light phase interference, polarization rotation by means of birefringence and microbending loss. Prior art fiberoptic sensors may generally be categorized as either amplitude or phase (interferometric) sensors.

In an amplitude sensor, a physical perturbation interacts with the fiber or some device attached to the fiber to directly modulate the intensity of the light in the fiber. Phase sensors, while offering increased sensitity over amplitude sensors, are more complex. A detailed survey of fiberoptic sensors has been described by Giallorenzi, et al in "Optical Fiber Sensor Technology", IEEE Journal of Quantum Electronics, Vol. QE18, No. 4, April 1982, pp 626–665. While progress in fiberoptic technology has been rapid, practical problems remain, for example, in noise sources, detection processing and packaging. The present invention adds another category of fiberoptic sensors to the art which may be called ratio sensors. The ratio of light energy in the output fibers changes in response to applied stress on the medium surrounding a fiberoptic directional coupler.

SUMMARY OF THE INVENTION

The present invention provides a fiberoptic sensor apparatus comprising a fused, tapered biconical directional coupler surrounded by a stress birefringent medium. A transducer mechanism, for example, a proof mass for an accelerometer, a diaphram for a microphone or pressure sensor, or a magnetostrictive envelope for a magnetometer converts the parameter to be sensed into a force directly applied to the stress birefringent medium. The applied stress which may be external or internal to the medium changes the refractive index of the birefringent medium which causes the ratio of output power in each branch of the directional coupler to vary.

BRIEF DESCRIPTION OF THE DRAWINGS

FIG. 2a is a cross-sectional view of the present invention configured as an accelerometer.

FIG. 2b is a section view of FIG. 2a along line 2b—2b.

DESCRIPTION OF THE PREFERRED EMBODIMENT

Figure 1:
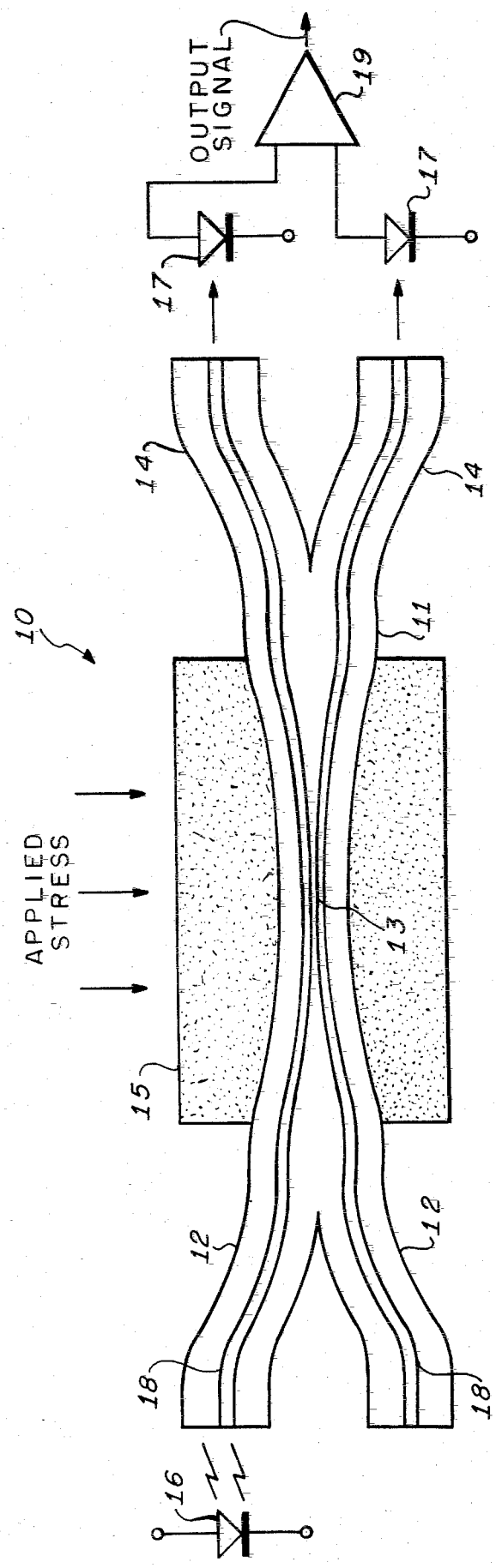
FIG. 1 illustrates the components of a variable coupler fiberoptic sensor.

A description and analysis of biconical single mode fiberoptic couplers suitable for use with the present invention has been made by J. Bures, et al in an article titled "Analyse d'un Coupleur Bidirectionnel a Fibres Optiques Monomodes Fusionnes", Applied Optics, (Journal of the Optical Society of America) Vol. 22, No. 12, June 15, 1983, pp. 1918-1922. Diffusion of two fibers to form a directional coupler generally provides a structure such as that shown in FIG. 1. Stretching of the fibers insures that in the preponderant part of the coupler, that is, in the neighborhood of the waist portion 13 the cores of the two optical fibers are fused and constitute a single optical waveguide with a unified cladding 11. In the fused state the system is equivalent to two parallel and tangential circular cores surrounded by uniform cladding. A single mode optical signal excitation in one of the cores of the two input optical fibers, as for example, the core 18, corresponds to the super position of a symmetric and an asymmetric mode in the waist portion 13. Division of energy in the two output optical fibers 14 is a function of the length of the waist portion 13 and the relative propagation constants of the symmetric and asymmetric modes. These propagation constants are determined by the index of refraction of the cladding about the waist portion 13. The ratio of the cladding to core indices of refraction determine the maximum incident angles to the boundry for total interal reflection in the core and consequently the modal wave length. Since the propagation constant is a function of the modal wave length, a variation in the index of refraction of the cladding, with a constant core refractive index, alters the modal propagation constants and consequently the optical energy distribution between the two output optical fibers 14.

Referring again to FIG. 1, the variable coupler fiberoptic sensor 10 of the present invention is illustrated. A fused biconical fiberoptic directional coupler 11 is manufactured from two fibers 12 by known techniques. The resulting waist portion 13 has a reduced diameter due to the fusion and stretching operations. In the waist portion 13, the cores 18 lose their guiding properties and waist portion 13 as a whole may become for example, in cross-section, an elliptical shaped guide with the surrounding medium 15 for cladding. Thus, in the waist portion 13, the biconical fused directional coupler 11 becomes for all practical purposes a single guide in which the cores 18 of the original fibers 12 play an insignificant role and coupling of light energy to the output fibers 14 is accomplished by a beat phenomenon between two modes in waist portion 13. The division of optical energy in the output fibers 14 caused by the beat phenomenon is a function both of the physical dimensions of the fused waist portion 13 and the index of refraction of medium 15 surrounding waist portion 13. Medium 15 may be, for example, a stress birefringent material, that is a material whose index of refraction is proportional to applied stress. One example of a stress birefringent material suitable for use as medium 15 of the present invention is a silicone elastomer such as General Electric Co. RTV-12. However, any material whose index of refraction varies as a function of applied stress may be suitable to practice the present invention.

In practice, one input fiber 12 is illuminated by a source of optical energy 16 which may be an infrared source. The optical energy is divided by the fused biconical directional coupler and coupled to output fibers 14 in a ratio that changes as the index of refraction of medium 15 changes in a function of the applied stress. The changes in optical energy in output fibers 14 may be measured by two photodetectors 17 which provide electrical inputs to differential amplifier 19. Thus the output signal of differential amplifier 19 is representative of the stress applied to medium 15.

Stress may be applied to the fiberoptic sensor 10 through an internal or external mechanism. To apply stress internally, a macroscopic stress state may be created by adding various materials to medium 15, ideally in the form of microscopic particles mixed into medium 15 before it is cured. For example, to sense electric fields, an electro-strictive powered material such as $PVF_2$ may be added to medium 15. The present invention may be used as a thermal sensor by adding a thermally expansive material such as nickel or aluminum to medium 15. To sense magnetic fields, a magnetostrictive alloy such as nickel and iron may be added to medium 15. Polystryene or nylon may be added to medium 15 to enhance sensitivity when the present invention is used as an acoustic sensor.

Stress may be applied externally by a force which is transmitted directly into medium 15. External stress may be applied to medium 15 by macroscopic devices such as, for example, diaphrams, levers, electrostrictive, magnetostrictive and thermostrictive elements. In general, any mechanism that converts a physical or field effect into a force may be used to apply stress to a stress birefringent material and thereby may be sensed by optical means through the present invention.

Referring now to FIG. 2a and 2b, an embodiment of the present invention used as an accelerometer 20 is illustrated. A fused, biconical, directional coupler 11 is placed within a rigid cylinder 22. Input fibers 12 and output fibers 14 extend through the cylinder wall. Fibers 12 and 14 may be held in place with epoxy 23. The interior of cylinder 22 is filled with a stress birefringent silicone elastomer 15 such as General Electric RTV-12 which encapsulates the fused, biconical, directional coupler 11. A proof mass 25 is disposed on top of the stress birefringent medium 15 at the center of cylinder 22. Acceleration of the device causes the proof mass to exert a force on the elastometer 15, altering its refractive index and the ratio of the optical energy division between the two output optical fibers 14. The ratio of output power and the change in the ratio of output power proportional to applied stress is a function of the optical, material and geometric properties of the apparatus. More specifically, the coupling ratio factors include:

1. The index of refraction of medium 15;
2. The length of waist portion 13;
3. The length of the transition region between the waist portion 13 and input fibers 12 and output fibers 14;
4. The diameter of the fibers 12 and 14 and the diameter of the waist portion 13;
5. The wavelength of light source 16; and
6. The properties of the fiber selected.

By selecting a suitable configuration of material, desired operating points and changes in output power ratios may be achieved.

While the invention has been described in its preferred embodiments, it is to be understood that the words which have been used are words of description rather than limitation and that changes may be made within the purview of the appended claims without departing from the true scope and spirit of the invention in its broader aspects.

We claim:

1. A fiberoptic sensor comprising:

fiberoptic coupler means having a plurality of input optical fibers each having a core, said cores of said optical fibers merged and fused in a waist region to form a common optical core wherefrom a plurality of output optical fibers emerge, said fiberoptic coupler for distributing light energy incident to one of said input optical fibers between said plurality of output optical fibers, means having refractive index variable with stress applied thereto for encapsulating said common optical core, such that said incident light energy is distributed between said plurality of output optical fibers as a function of stress applied to said refractive index means, and detector means coupled to said plurality of output optical fibers for providing output signals representative of said optical energy distribution in said plurality of output optical fibers.

2. A fiberoptic sensor as recited in claim 1 wherein said encapsulating means is a stress birefringent silicone elastomer.

3. A fiberoptic sensor as recited in claim 1 further including means for applying external stress to said encapsulating means.

4. A fiberoptic sensor as recited in claim 1 further including means for applying internal stress to said encapsulating means by combining therein materials responsive to a parameter to be sensed.

5. A fiberoptic coupler according to claim 1 wherein said detector means comprises:

a plurality of photodetector diodes disposed to receive optical energy from said outputfibers and provide electrical signals representative of received optical energy;

at least one differential amplifier coupled to receive said electrical signals and provide said output signals representative of aid optical energy distribution.

6. A fiberoptic sensor as recited in claim 3 wherein said external stress means is a mass disposed on said refractive index means, thereby stressing said refractive index means in accordance with acceleration and causing a refractive index variation with a concomitant variation in optical energy distribution between said plurality of output optical fibers.

* * * * *